US012500340B2

(12) United States Patent
Hsiao et al.

(10) Patent No.: US 12,500,340 B2
(45) Date of Patent: Dec. 16, 2025

(54) MULTIBAND PRINTED ANTENNA

(71) Applicant: Cheng Uei Precision Industry Co., LTD., New Taipei (TW)

(72) Inventors: Lan-Yung Hsiao, New Taipei (TW); Ping-Chun Lu, New Taipei (TW); Shao-Kai Sun, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 102 days.

(21) Appl. No.: 18/395,458

(22) Filed: Dec. 22, 2023

(65) Prior Publication Data

US 2024/0332803 A1 Oct. 3, 2024

(30) Foreign Application Priority Data

Mar. 28, 2023 (CN) ......................... 202320630820.3

(51) Int. Cl.
*H01Q 5/371* (2015.01)
*H01Q 9/42* (2006.01)

(52) U.S. Cl.
CPC ............... *H01Q 5/371* (2015.01); *H01Q 9/42* (2013.01)

(58) Field of Classification Search
CPC ........ H01Q 5/307; H01Q 5/342; H01Q 5/357; H01Q 5/364; H01Q 5/371; H01Q 9/42
See application file for complete search history.

(56) References Cited

U.S. PATENT DOCUMENTS 7,466,272 B1 * 12/2008 Su ........................ H01Q 1/2266 343/702
2010/0225551 A1 * 9/2010 Yang ...................... H01Q 21/30 343/749

* cited by examiner

*Primary Examiner* — Daniel Munoz
(74) *Attorney, Agent, or Firm* — Cheng-Ju Chiang

(57) ABSTRACT

A multiband printed antenna includes a circuit board, a radiator unit and a grounding unit. The radiator unit is arranged on the circuit board. The radiator unit includes a feed-in portion, a first radiant portion slantwise extended upward and rightward from a right of a first top edge of the feed-in portion, and a second radiant portion extended rightward and then extended upward from a first right edge of the feed-in portion. The first radiant portion is formed in a strip shape. The second radiant portion is formed in a lying L shape. A first inner edge of the second radiant portion is separated from a top end of the first radiant portion. The grounding unit is arranged on the circuit board. The radiator unit and the grounding unit are separated from each other.

9 Claims, 7 Drawing Sheets

| Frequency(GHz) | Efficiency(%) |
|---|---|
| 2.4 | 71.65 |
| 2.45 | 71.96 |
| 2.5 | 69.57 |
| 5.15 | 57.68 |
| 5.25 | 55.98 |
| 5.35 | 57.25 |
| 5.55 | 75.79 |
| 5.75 | 66.34 |
| 5.85 | 68.97 |

(Data Table)

FIG. 7

MULTIBAND PRINTED ANTENNA

CROSS-REFERENCE TO RELATED APPLICATIONS

The present application is based on, and claims priority from, China Patent Application No. 202320630820.3, filed Mar. 28, 2023, the disclosure of which is hereby incorporated by reference herein in its entirety.

PRIOR ART

With the rapid development of wireless communication industries, Wi-Fi 6E (Extended) technology is gradually applied widely, the Wi-Fi 6E technology uses the same standard as an original Wi-Fi 6 GHz band. An available channel which is owned by the Wi-Fi 6E technology expands to the original Wi-Fi 6 GHz band which is belonged by a frequency band ranged from 5.925 GHz to 7.125 GHz. However, the original Wi-Fi 6 GHz band is adopted popularly, and a market trend of electronic device miniaturization, demands for multiband antennas that support the Wi-Fi 6 GHz band and have smaller sizes are increased.

Therefore, it is necessary to provide a multiband printed antenna which increases providable frequency bands and supports a Wi-Fi 6 GHz frequency band in a limited space.

BACKGROUND OF THE INVENTION

The present invention generally relates to an antenna, and more particularly to a multiband printed antenna.

SUMMARY OF THE INVENTION

An object of the present invention is to provide a multiband printed antenna. The multiband printed antenna is mounted in an electronic device. The multiband printed antenna includes a circuit board, a radiator unit and a grounding unit. The radiator unit is arranged on the circuit board. The radiator unit includes a feed-in portion, a first radiant portion slantwise extended upward and rightward from a right of a first top edge of the feed-in portion, and a second radiant portion extended rightward and then extended upward from a first right edge of the feed-in portion. The first radiant portion is formed in a strip shape. The second radiant portion is formed in an L shape. A first inner edge of the second radiant portion is separated from a top end of the first radiant portion. The grounding unit is arranged on the circuit board. The radiator unit and the grounding unit are separated from each other. The grounding unit is positioned to a left of the radiator unit. The grounding unit has a grounding portion, a first extending portion extended upward and rightward from an upper edge of the grounding portion, and a second extending portion extended upward and then extended rightward from the upper edge of the grounding portion. The first extending portion is formed in a strip shape, and the second extending portion is formed in an inverted-L shape. A second right edge of the grounding portion is separated from a first left edge of the feed-in portion by a first horizontal distance. A first bottom edge of the feed-in portion is flush with a second bottom edge of the grounding portion. A second inner edge of the second extending portion is separated from a top end of the first extending portion Another object of the present invention is to provide a multiband printed antenna. The multiband printed antenna is mounted in an electronic device. The multiband printed antenna includes a circuit board, a radiator unit and a grounding unit. The radiator unit is arranged on the circuit board. The radiator unit includes a feed-in portion, a first radiant portion slantwise extended upward and rightward from a right of a first top edge of the feed-in portion, and a second radiant portion extended rightward and then extended upward from a first right edge of the feed-in portion. The first radiant portion is formed in a strip shape. The second radiant portion is formed in an L shape. A first inner edge of the second radiant portion is separated from a tail end of the first radiant portion. The second radiant portion includes a first section extended rightward from the first right edge of the feed-in portion, and a second section vertically extended upward from a right end of the first section. The grounding unit is arranged on the circuit board. The radiator unit and the grounding unit are separated from each other. The grounding unit is positioned to a left of the radiator unit. The grounding unit has a grounding portion, a first extending portion extended upward and rightward from an upper edge of the grounding portion, and a second extending portion extended upward and then extended rightward from the upper edge of the grounding portion. The first extending portion is formed in a strip shape, and the second extending portion is formed in an inverted-L shape. A second right edge of the grounding portion is separated from a first left edge of the feed-in portion by a first horizontal distance. A second left edge of the second section is separated from a right corner of the first radiant portion by a second horizontal distance. A first bottom edge of the feed-in portion is flush with a second bottom edge of the grounding portion. A second inner edge of the second extending portion is separated from a top end of the first extending portion.

Another object of the present invention is to provide a multiband printed antenna. The multiband printed antenna is mounted in an electronic device. The multiband printed antenna includes a circuit board, a radiator unit and a grounding unit. The radiator unit is arranged on the circuit board. The radiator unit includes a feed-in portion, a first radiant portion slantwise extended upward and rightward from a right of a first top edge of the feed-in portion, and a second radiant portion extended rightward and then extended upward from a first right edge of the feed-in portion. The first radiant portion is formed in a strip shape. The second radiant portion is formed in an L shape. A first inner edge of the second radiant portion is separated from a tail end of the first radiant portion. The second radiant portion includes a first section extended rightward from the first right edge of the feed-in portion. The grounding unit is arranged on the circuit board. The radiator unit and the grounding unit are separated from each other. The grounding unit is positioned to a left of the radiator unit. The grounding unit has a grounding portion, a first extending portion extended upward and rightward from an upper edge of the grounding portion, and a second extending portion extended upward and then extended rightward from the upper edge of the grounding portion. The first extending portion is formed in a strip shape, and the second extending portion is formed in an inverted-L shape. A second right edge of the grounding portion is separated from a first left edge of the feed-in portion by a first horizontal distance. A second top edge of the first section is intersected with a third right edge of the first radiant portion to form a first angle between the second top edge of the first section and the third right edge of the first radiant portion. A first bottom edge of the feed-in portion is flush with a second bottom edge of the grounding portion. A second inner edge of the second extending portion is separated from a top end of the first extending portion.

As described above, the multiband printed antenna is operated in a limited space, the multiband printed antenna increases providable frequency bands, and the multiband printed antenna is operated in wider bandwidths which supports a Wi-Fi 6 GHz frequency band to meet a development trend of a Wi-Fi 6E technology popularity and miniaturization of electronic products.

BRIEF DESCRIPTION OF DRAWINGS

The present invention will be apparent to those skilled in the art by reading the following description, with reference to the attached drawings, in which:

FIG. 7 is a data table showing efficiencies of the multiband printed antenna which are corresponding to frequencies of the multiband printed antenna in accordance with the preferred embodiment of the present invention.

DETAILED DESCRIPTION OF THE INVENTION

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1:
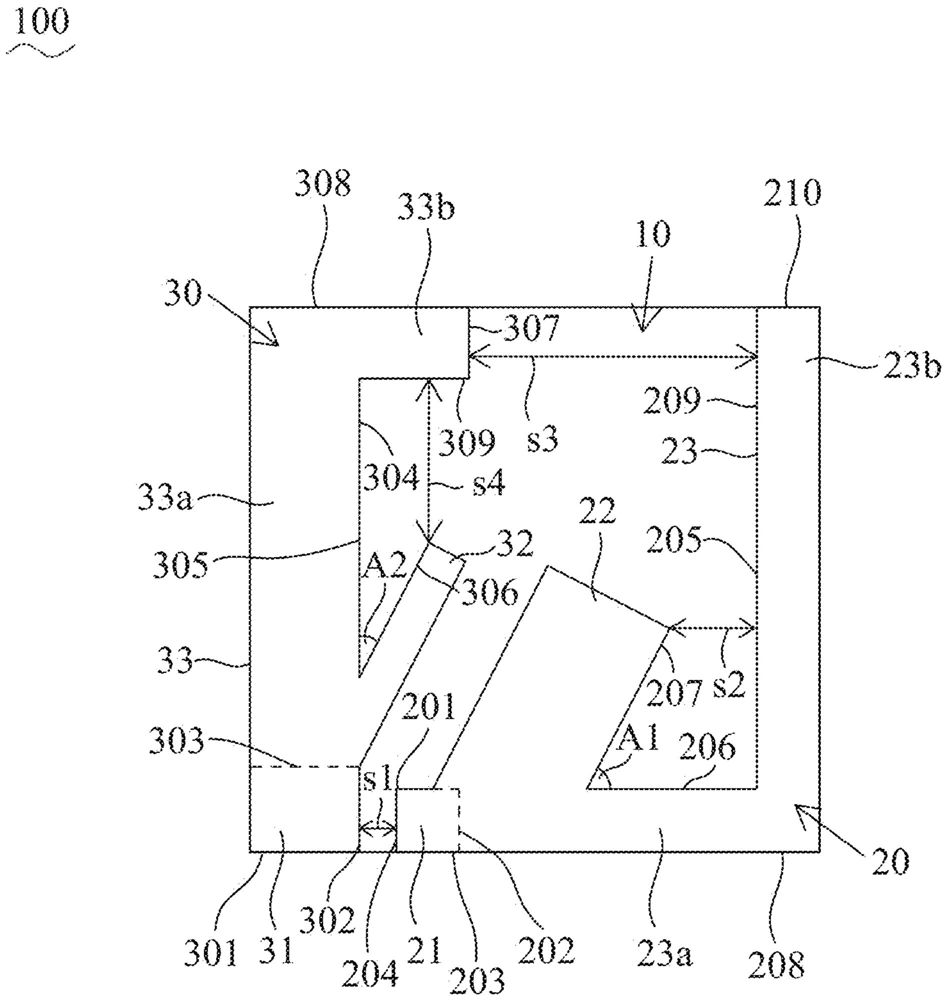
FIG. 1 is a front view of a multiband printed antenna according to a preferred embodiment of the present invention.

Referring to FIG. 1, a multiband printed antenna 100 in accordance with a preferred embodiment of the present invention is shown. The multiband printed antenna 100 is a dipole antenna. The multiband printed antenna 100 is arranged on a circuit board 10 which is mounted in an electronic device (not shown). The multiband printed antenna 100 includes a radiator unit 20 and a grounding unit 30. The radiator unit 20 and the grounding unit 30 are both arranged on the circuit board 10, and the radiator unit 20 and the grounding unit 30 are separated from each other. For ease of explanation, the following terms "upward." "top end," "rightward," "horizontal," and "slantwise," used to specify directions in this manual, are defined based on the perspective of observing the setup plane of the multiband printed antenna 100 as shown in FIG. 1. These terms refer to the upper side, right side, horizontal direction, and the direction between vertical and horizontal, respectively.

The radiator unit 20 includes a feed-in portion 21, a first radiant portion 22 and a second radiant portion 23. The feed-in portion 21 is a substantially rectangle shape. The first radiant portion 22 is slantwise extended upward and rightward from a right of a first top edge 201 of the feed-in portion 21, and the first radiant portion 22 is formed in a strip shape. The second radiant portion 23 is extended rightward and then extended upward from a first right edge 202 of the feed-in portion 21, and the second radiant portion 23 is formed in an L shape. A first inner edge 205 of the second radiant portion 23 faces a top end of the first radiant portion 22. The first inner edge 205 of the second radiant portion 23 is separated from the top end of the first radiant portion 22.

The grounding unit 30 is positioned to a left of the radiator unit 20. The grounding unit 30 has a grounding portion 31, a first extending portion 32 and a second extending portion 33. The grounding portion 31 is a rectangular shape. The grounding portion 31 and the feed-in portion 21 are abreast disposed transversely. A first bottom edge 203 of the feed-in portion 21 is flush with a second bottom edge 301 of the grounding portion 31. A first left edge 204 of the feed-in portion 21 faces a second right edge 302 of the grounding portion 31. The first left edge 204 of the feed-in portion 21 is parallel with the second right edge 302 of the grounding portion 31. The second right edge 302 of the grounding portion 31 is separated from the first left edge 204 of the feed-in portion 21 by a first horizontal distance s1. The first extending portion 32 is extended upward and rightward from an upper edge 303 of the grounding portion 31, and the first extending portion 32 is formed in a strip shape. The second extending portion 33 is extended upward and then is extended rightward from the upper edge 303 of the grounding portion 31, and the second extending portion 33 is formed in an inverted-L shape. A second inner edge 304 of the second extending portion 33 is separated from a top end of the first extending portion 32.

Referring to FIG. 1, the second radiant portion 23 includes a first section 23*a* and a second section 23*b*. The first section 23*a* is extended rightward from the first right edge 202 of the feed-in portion 21. A second top edge 206 of the first section 23*a* is intersected with a third right edge 207 of the first radiant portion 22 to form a first angle A1 between the second top edge 206 of the first section 23*a* and the third right edge 207 of the first radiant portion 22, and the first angle A1 is an acute angle. A third bottom edge 208 of the first section 23*a* is flush with the first bottom edge 203 of the feed-in portion 21 and the second bottom edge 301 of the grounding portion 31. The second section 23*b* is extended upward from a right end of the first section 23*a*. A second left edge 209 of the second section 23*b* faces a right corner of the first radiant portion 22. The second left edge 209 of the second section 23*b* is separated from the right corner of the first radiant portion 22 by a second horizontal distance s2. The second section 23*b* is vertically extended upward along a straight line from the right end of the first section 23*a*, so a top end of the second section 23*b* is higher than the top end of the first radiant portion 22.

In this preferred embodiment, the second extending portion 33 includes a third section 33*a* and a fourth section 33*b*. The third section 33*a* is extended upward from the upper edge 303 of the grounding portion 31. A fourth right edge 305 of the third section 33*a* is intersected with a third left edge 306 of the first extending portion 32 to form a second angle A2 between the fourth right edge 305 of the third section 33*a* and the third left edge 306 of the first extending portion 32. And the second angle A2 is another acute angle. The fourth section 33*b* is horizontally extended rightward from a top end of the third section 33*a*. A fifth right edge 307 of the fourth section 33*b* faces the second left edge 209 of the second section 23*b*. The fifth right edge 307 of the fourth section 33*b* is parallel with the second left edge 209 of the second section 23*b*. The fifth right edge 307 of the fourth section 33*b* is separated from the second left edge 209 of the second section 23*b* by a third horizontal distance s3.

A third top edge 210 of the second section 23*b* is flush with a fourth top edge 308 of the fourth section 33*b*. A fourth bottom edge 309 of the fourth section 33*b* faces a top corner of the first extending portion 32. The fourth bottom edge 309 of the fourth section 33*b* is separated from the top corner of the first extending portion 32 by a vertical distance s4. An extending path of the first radiant portion 22 is parallel to an extending path of the first extending portion 32. The top end of the first extending portion 32 is slightly higher than the top end of the first radiant portion 22. The top corner of the first extending portion 32 is slightly higher than a top corner of the first radiant portion 22. An extending path of the first section 23*a* is parallel to an extending path of the fourth section 33*b*. An extending path of the second section 23*b* is parallel to an extending path of the third section 33*a*.

In order to make the first angle A1, the second angle A2, the first horizontal distance s1, the second horizontal distance s2, the third horizontal distance s3 and the vertical distance s4 have coupling functions, electric fields and magnetic fields of the feed-in portion 21, the first radiant portion 22 and the second radiant portion 23 are alternately transmitted, and the electric fields and the magnetic fields of the feed-in portion 21, the first radiant portion 22 and the second radiant portion 23 are interacted to oscillate electromagnetic waves in a frequency band which is ranged from 2.4 GHz to 2.5 GHz and a frequency band which is ranged from 5 GHz to 7.2 GHz. In practice, the first radiant portion 22 is parallel to the first extending portion 32, and a sum of the first angle A1 and the second angle A2 is ninety degrees. And dimensional requirements of the first horizontal distance s1, the second horizontal distance s2, the third horizontal distance s3 and the vertical distance s4 are adjusted according to applied different electronic devices.

When the multiband printed antenna 100 is used for a wireless communication, a current is fed by the feed-in portion 21. The current passes through the first radiant portion 22, electromagnetic waves in the frequency band which is ranged from 5 GHz to 7.2 GHz are oscillated. The current passes through the second radiant portion 23, electromagnetic waves in the frequency band which is ranged from 2.4 GHz to 2.5 GHz are oscillated. The first extending portion 32 is mutually coupled with the first radiant portion 22 to oscillate the electromagnetic waves in the frequency band which is ranged from 5 GHz to 7.2 GHz. The second extending portion 33 is mutually coupled with the second radiant portion 23 to oscillate the electromagnetic waves in the frequency band which is ranged from 2.4 GHz to 2.5 GHz. The multiband printed antenna 100 increases the providable frequency bands and supports a Wi-Fi 6 GHz frequency band in a limited space.

Figure 2:
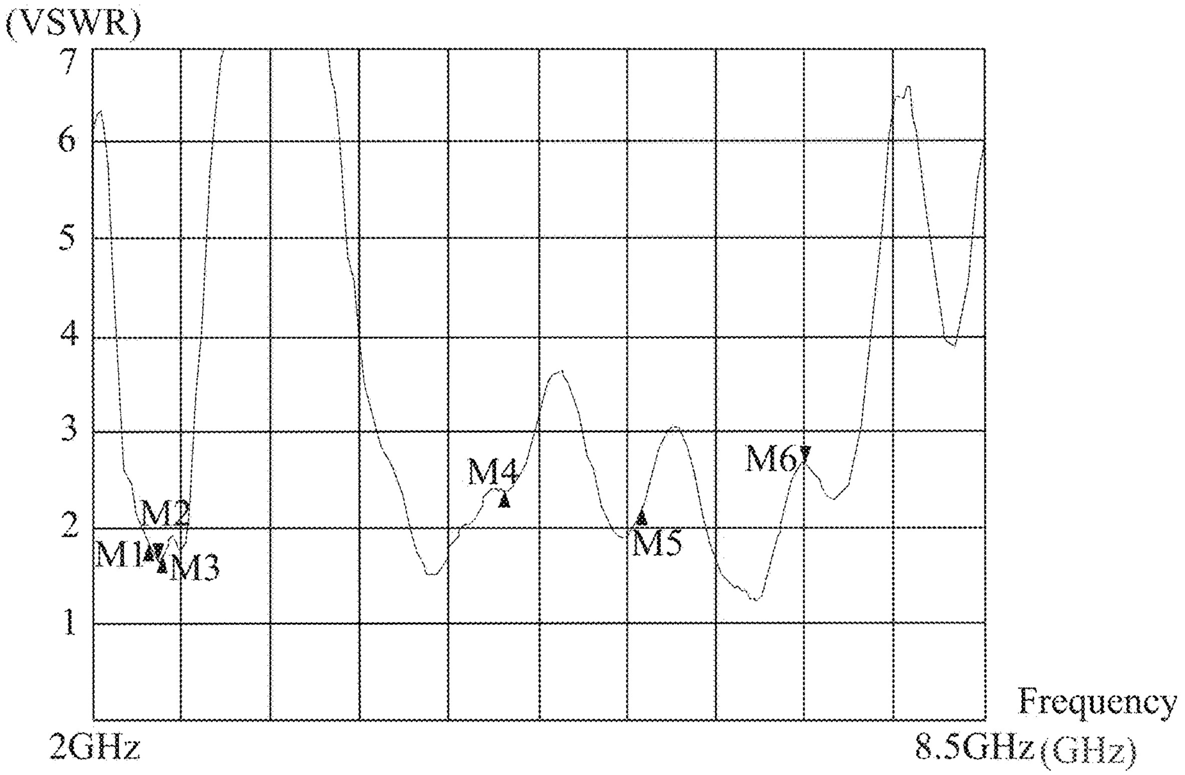
FIG. 2 is a voltage standing wave ratio (VSWR) chart of the multiband printed antenna according to the preferred embodiment of the present invention.
Figure 3:
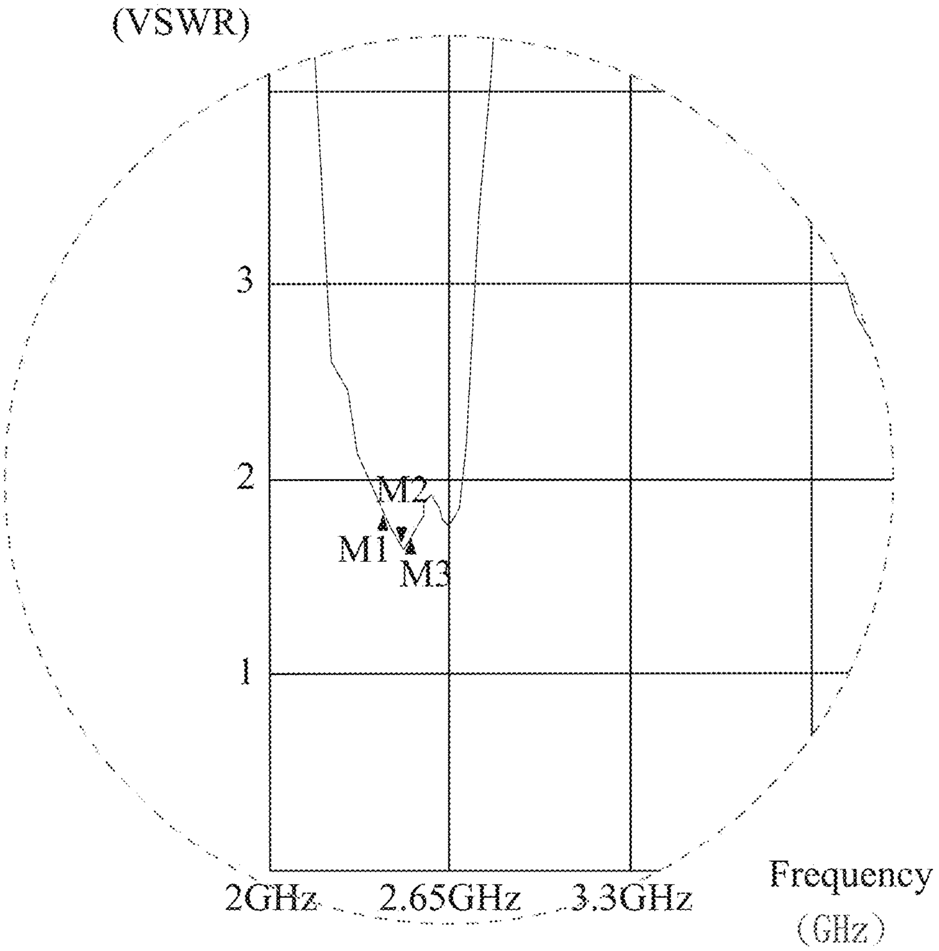
FIG. 3 is a partial enlarged view of the voltage standing wave ratio (VSWR) chart of the multiband printed antenna of FIG. 2.
Figure 4:
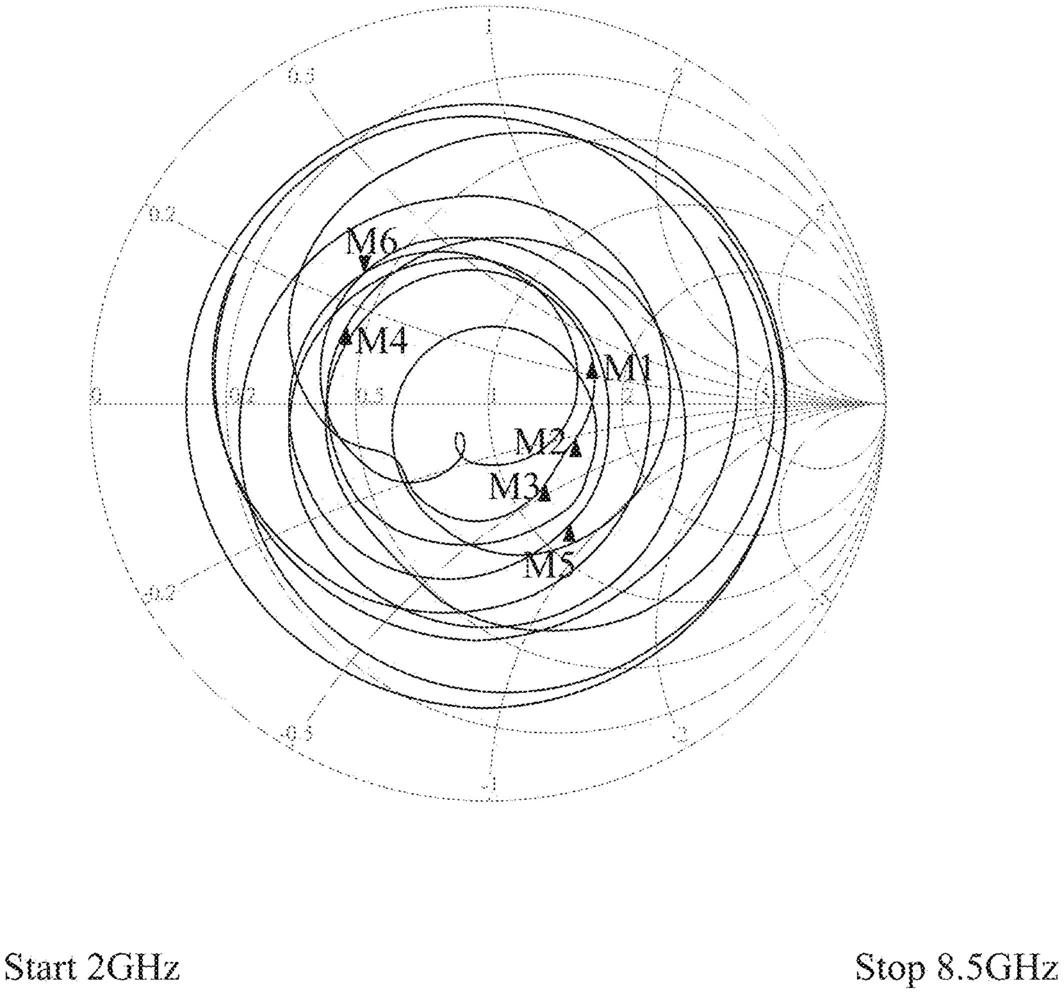
FIG. 4 is a smith chart of the multiband printed antenna according to the preferred embodiment of the present invention.
Figure 5:
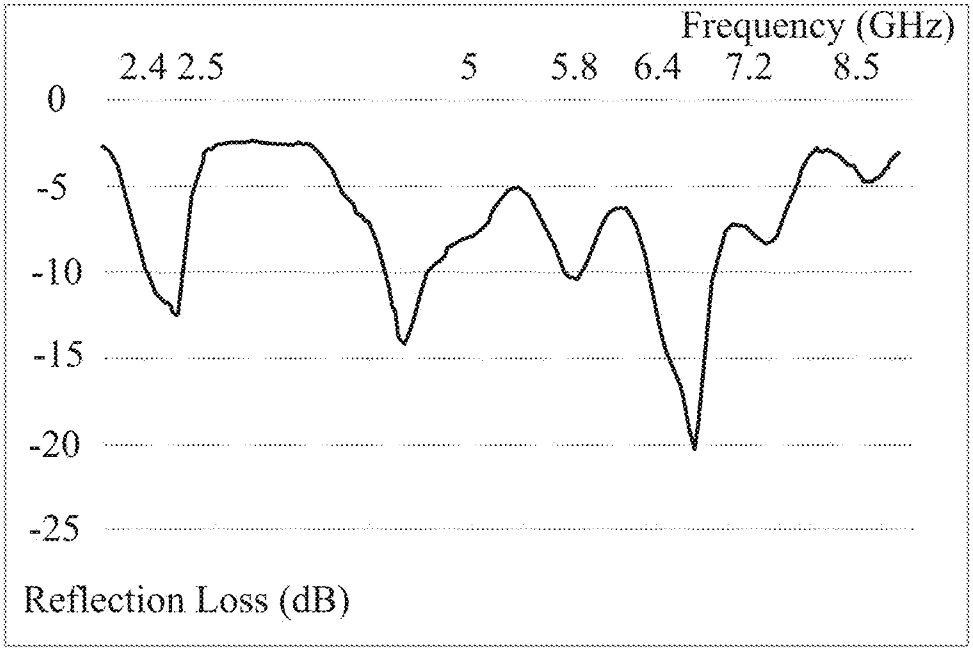
FIG. 5 is a reflection loss chart of the multiband printed antenna according to the preferred embodiment of the present invention.

Referring to FIG. 1 to FIG. 4, a voltage standing wave ratio (VSWR) chart of the multiband printed antenna 100 according to the present invention is shown in FIG. 2. A smith chart of the multiband printed antenna 100 according to the present invention is shown in FIG. 4. When the multiband printed antenna 100 is operated at 2.4 GHz, a VSWR value is 1.8028 which is shown at a position M1 of FIG. 2. When the multiband printed antenna 100 is operated at 2.45 GHz, a VSWR value is 1.6392 which is shown at a position M2 of FIG. 2. When the multiband printed antenna 100 is operated at 2.5 GHz, a VSWR value is 1.6726 which is shown at a position M3 of FIG. 2. When the multiband printed antenna 100 is operated at 5 GHz, a VSWR value is 2.3731 which is shown at a position M4 of FIG. 2. When the multiband printed antenna 100 is operated at 6 GHz, a VSWR value is 2.1706 which is shown at a position M5 of FIG. 2. When the multiband printed antenna 100 is operated at 7.2 GHz, a VSWR value is 2.6624 which is shown at a position M6 of FIG. 2. Therefore, the multiband printed antenna 100 according to the present invention are able to be stably operated in the frequency band which is ranged from 2.4 GHz~ 2.5 GHz and the frequency band which is ranged from 5 GHz to 7.2 GHz.

Referring to FIG. 1 to FIG. 5, when the multiband printed antenna 100 is operated at the frequency band which is ranged from 2.4 GHz to 2.5 GHz and the frequency band which is ranged from 5 GHz to 7.2 GHz, reflection losses of bandwidths of the frequency band which is ranged from 2.4 GHz to 2.5 GHz and the frequency band which is ranged from 5 GHz to 7.2 GHz are approximately within −10 dB, so a loss extent of the multiband printed antenna 100 is small, and a radiation energy of the multiband printed antenna 100 is large.

Figure 6:
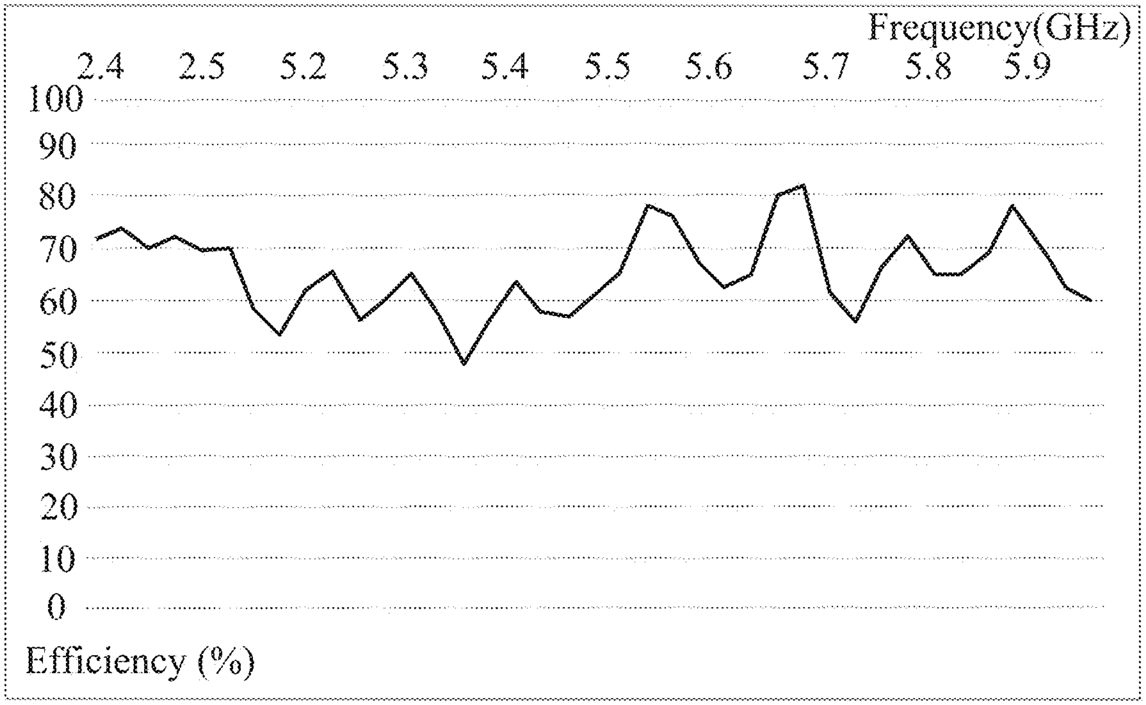
FIG. 6 is an efficiency chart of the multiband printed antenna according to the preferred embodiment of the present invention.

Referring to FIG. 1 to FIG. 7, an efficiency chart of the multiband printed antenna 100 according to the present invention is shown in FIG. 6. A data table of the multiband printed antenna 100 according to the present invention is shown in FIG. 7. Generally speaking, when the multiband printed antenna 100 is operated at different frequencies, the higher an efficiency of the multiband printed antenna 100 which is converted from an average power is, the better the efficiency of the multiband printed antenna 100 is. In this preferred embodiment, the efficiencies of the multiband printed antenna 100 that are operated at the frequency band which is ranged from 2.4 GHz to 2.5 GHz and the frequency band which is ranged from 5 GHz to 7.2 GHz are mostly above 60%, therefore, the multiband printed antenna 100 is operated in a limited space and is able to achieve a higher efficiency in a predetermined frequency band. In addition, the efficiency of the multiband printed antenna 100 keeps a certain level.

As described above, the multiband printed antenna 100 is operated in the limited space, the multiband printed antenna 100 increases the providable frequency bands, and the multiband printed antenna 100 is operated in wider bandwidths which supports a Wi-Fi 6 GHz frequency band to meet a development trend of a Wi-Fi 6E technology popularity and miniaturization of electronic products.

The invention claimed is:

1. A multiband printed antenna mounted in an electronic device, the antenna defining a first edge, and comprising:

a circuit board;

a radiator unit arranged on the circuit board, the radiator unit including a feed-in portion disposed next to the first edge, a first radiant portion extending away from the feed-in portion slantwise relative to the first edge, and a second radiant portion extending away from the feed-in portion along the first edge, and then extending perpendicularly to the first edge at a same side of the first edge as the first radiant portion, the first radiant portion being formed in a strip shape, the second radiant portion being formed in an L shape, a part of the second radiant portion extending perpendicularly to the first edge being separated from an extending end of the first radiant portion; and a grounding unit arranged on the circuit board, the radiator unit and the grounding unit being separated from each other, the grounding unit being positioned side-by-side with the radiator unit, the grounding unit having a grounding portion disposed next to the first edge, a first extending portion extending away from the grounding portion slantwise relative to the first edge, and a second extending portion extending away from the grounding portion perpendicularly to the first edge, and then extending perpendicularly along a direction approaching the first extending portion, the first extending portion being formed in a strip shape, and the second extending portion being formed in an inverted-L shape;

wherein the grounding portion is separated from the feed-in portion by a first distance, the feed-in portion is flush with the grounding portion at the first edge, a part of the second extending portion extending perpendicularly to the first edge being separated from the first extending portion.

2. The multiband printed antenna as claimed in claim 1, wherein the second radiant portion includes a first section extending from the feed-in portion along the first edge, and a second section vertically extending from the first section, the first section is intersected with the first radiant portion to form a first angle between the first section and the first radiant portion, the first section is flush with the feed-in portion and the grounding portion at the first edge, the second section is separated from the extending end of the first radiant portion by a second distance.

3. The multiband printed antenna as claimed in claim 2, wherein the second extending portion includes a third section extending perpendicularly to the first edge from the grounding portion, and a fourth section extending perpendicularly from an extending end of the third section, the third section is intersected with the first extending portion to form a second angle between the third section and the first extending portion, an extending end of the fourth section is separated from the second section by a third distance, the second section is flush with the fourth section at a second edge of the antenna defined opposite to the first edge, the fourth section is separated from an extending end of the first extending portion by a fourth distance.

4. The multiband printed antenna as claimed in claim 3, wherein the extending end of the first extending portion is closer to the fourth section than the first radiant portion, an extending path of the first section is parallel to an extending path of the fourth section, an extending path of the second section is parallel to an extending path of the third section.

5. The multiband printed antenna as claimed in claim 4, wherein the first radiant portion is parallel to the first extending portion, and a sum of the first angle and the second angle is ninety degrees.

6. The multiband printed antenna as claimed in claim 3, wherein the first angle is an acute angle, and the second angle is another acute angle.

7. The multiband printed antenna as claimed in claim 1, wherein the feed-in portion is a rectangle shape.

8. A multiband printed antenna mounted in an electronic device, the antenna defining an edge, and comprising:

a circuit board;

a radiator unit arranged on the circuit board, the radiator unit including a feed-in portion disposed next to the edge, a first radiant portion extending away from the feed-in portion slantwise relative to the edge, and a second radiant portion extending away from the feed-in portion along the edge, and then extending perpendicularly to the edge at a same side of the edge as the first radiant portion, the first radiant portion being formed in a strip shape, the second radiant portion being formed in an L shape, the second radiant portion including a first section extending from the feed-in portion along the edge, and a second section vertically extending from the first section; and a grounding unit arranged on the circuit board, the radiator unit and the grounding unit being separated from each other, the grounding unit being positioned side-by-side with the radiator unit, the grounding unit having a grounding portion disposed next to the edge, a first extending portion extending away from the grounding portion slantwise relative to the edge, and a second extending portion extending away from the grounding portion perpendicularly to the edge, and then extending perpendicularly along a direction approaching the first extending portion, the first extending portion being formed in a strip shape, and the second extending portion being formed in an inverted-L shape;

wherein the grounding portion is separated from the feed-in portion by a first distance, the second section is separated from an extending end of the first radiant portion by a second distance, the feed-in portion is flush with the grounding portion at the edge, the second extending portion being separated from an extending end of the first extending portion.

9. A multiband printed antenna mounted in an electronic device, the antenna defining an edge, and comprising:

a circuit board;

a radiator unit arranged on the circuit board, the radiator unit including a feed-in portion disposed next to the edge, a first radiant portion extending away from the feed-in portion slantwise relative to the edge, and a second radiant portion extending away from the feed-in portion along the edge, and then extending perpendicularly to the edge at a same side of the edge as the first radiant portion, the first radiant portion being formed in a strip shape, the second radiant portion being formed in an L shape, a part of the second radiant portion extending perpendicularly to the edge being separated from an extending end of the first radiant portion, the second radiant portion including a first section extending from the feed-in portion along the edge; and a grounding unit arranged on the circuit board, the radiator unit and the grounding unit being separated from each other, the grounding unit being positioned side-by-side with the radiator unit, the grounding unit having a grounding portion disposed next to the edge, a first extending portion extending away from the grounding portion slantwise relative to the edge, and a second extending portion extending away from the grounding portion perpendicularly to the edge, the first extending portion being formed in a strip shape, and the second extending portion being formed in an inverted-L shape;

wherein the grounding portion is separated from the feed-in portion by a first distance, the first section is intersected with the first radiant portion to form a first angle between the first section and the first radiant portion, the feed-in portion is flush with the grounding portion at the edge, the second extending portion being separated from an extending end of the first extending portion.

* * * * *